(12) United States Patent
Shahroudi et al.

(10) Patent No.: US 7,464,532 B2
(45) Date of Patent: Dec. 16, 2008

(54) APPARATUS FOR ELIMINATION OF TRANSIENT PRESSURE SPIKES ON STIFF FLUID SYSTEMS

(75) Inventors: Kamran Eftekhari Shahroudi, Fort Collins, CO (US); Kevin E. Greeb, Fort Collins, CO (US)

(73) Assignee: Woodward Governor Company, Fort Collins, CO (US)

( * ) Notice: Subject to any disclaimer, the term of this patent is extended or adjusted under 35 U.S.C. 154(b) by 669 days.

(21) Appl. No.: 11/258,304

(22) Filed: Oct. 25, 2005

(65) Prior Publication Data

US 2007/0089418 A1  Apr. 26, 2007

(51) Int. Cl.
*F02C 7/22* (2006.01)
*F02C 7/232* (2006.01)

(52) U.S. Cl. ...................... 60/39.091; 60/734
(58) Field of Classification Search ............ 60/734, 60/39.281, 39.094, 39.091; 137/593
See application file for complete search history.

(56) References Cited

U.S. PATENT DOCUMENTS 2,626,655 A * 1/1953 Trautman et al. ........ 60/39.281
2,696,831 A * 12/1954 Malick ..................... 137/505
3,017,922 A * 1/1962 Peterson ................ 60/39.281
4,606,191 A * 8/1986 Collins et al. ............. 60/734
5,003,769 A    4/1991 Cantwell
6,655,126 B2  12/2003 Walker et al.
6,807,801 B2 * 10/2004 McCarty ................ 60/39.094

OTHER PUBLICATIONS

International Search Report; International Application No. PCT/US2006/041629; Date of actual completion of the international search May 29, 2007; Date of mailing of the international search report Jun. 22, 2007; 3 pages.

* cited by examiner

*Primary Examiner*—Ted Kim
(74) *Attorney, Agent, or Firm*—Reinhart Boerner Van Deuren P.C.

(57) ABSTRACT

An apparatus for reducing pressure spikes in a fuel line having a shut-off valve is provided. The apparatus comprises a body housing a biasing member and a moveable separation member. The body has first, second, and third chambers. The first and second chambers are coupled to upstream and downstream sides of the fuel line, respectively. The third chamber is coupled to a return line. When the shut-off valve is open, the separation member is biased toward the first chamber and separates the first and second chambers. When the shut-off valve is closed, the separation member expands the first chamber and places the first chamber and the third chamber in fluid communication once the separation member has gained a significant speed. The expanded first chamber accumulates fuel and the third chamber accumulates and vents the fuel such that transient pressure spikes are reduced and unlikely to damage a turbine system.

21 Claims, 5 Drawing Sheets

APPARATUS FOR ELIMINATION OF TRANSIENT PRESSURE SPIKES ON STIFF FLUID SYSTEMS

FIELD OF THE INVENTION

This invention generally relates to a relief valve and, in more particularly, to a relief valve employable in an industrial turbine system.

BACKGROUND OF THE INVENTION

In the power generation industry, industrial turbine systems are used to generate electricity. The turbine systems include, among other things, an industrial turbine (e.g., a gas turbine), a supply tank, a supply skid, a metering skid, a pump, relief valves, shut-off valves, and connecting piping. The supply skid and metering skid cooperate to supply or feed the industrial turbine with a liquid fuel such as, for example, diesel fuel, jet fuel, kerosene, a gaseous fuel, and the like.

The characteristics of the fuel are such that a sudden closure of a shut-off valve (i.e., a stop valve) in the turbine system results in a rapid rise in pressure within the system often resulting in a pressure spike. The rise in pressure, or pressure spike, often continues until a pump (e.g., a positive displacement or centrifugal pump) driving the fuel through the system can be effectively shut down or until a relief valve opens. In addition to the continued operation of the pump, the pressure can also rise as a result of the inertia of the pump, control sensing delays, the "water hammer" effect, and the incompressible nature of the fuel being used.

The rate at which the pressure rises in the turbine system is often compounded when the shut-off valve closes very quickly. For example, in some cases, a shut-off valve used in the turbine system has to be very fast in order to protect the turbine from "overspeed" in certain operational and fault scenarios. The total shut-off time for the shut-off valve can be mere milliseconds. While closing the shut-off valve this quickly meets the requirements for discontinuing fuel flow to the turbine under emergency conditions, a rapid pressure rise of more than one hundred pounds per square inch (psi) per millisecond can be generated just upstream of the shut-off valve. With the pressure rising so quickly, some form of pressure relief must be provided before the pressure limitations of the equipment (e.g., pipes, fittings, etc.) are exceeded.

In addition to the rapidly rising pressure dilemma, the abrupt closure of the shut-off valve also triggers a large "inertial" pressure oscillation in the piping, which can be seventy feet in length or more, between the supply skid and the metering skid in some installations. The pressure oscillation can potentially damage sensitive equipment used on the skid (e.g., flow and pressure sensors, a filter canister, etc.).

While some relief valves have been designed to open very quickly to relieve pressure, these valves typically only provide a limited amount of flow. The limited amount of flow make these valves unusable in many turbine applications. As those skilled in the art can appreciate, increasing the flow area of a relief valve and reducing the opening time are conflicting design parameters. For example, attempts were made to design a relief valve that opens very quickly (i.e., in milliseconds or microseconds) to inhibit or prevent pressure spikes and inertial pressure oscillations while maintaining a sufficient effective maximum flow area to accommodate the amount of fuel (e.g., 150 gallons per minute) supplied by the fuel pump. While one embodiment of the relief valve was large enough to provide a full flow capability, the valve was limited to an opening response time of approximately forty milliseconds, which was simply too slow. Further optimization of the relief valve to improve on the forty millisecond response would likely create the potential for undesirable system instability due to relief valve chatter.

Other possible solutions have been tried by industry. In one instance, to address the transient pressure spike problem, two five gallon gas-charged bladder accumulators were installed upstream of the shut-off valves. These types of accumulators not only provide very fast pressure relief, they also have very large flow absorption rates. However, the pressure in the gas-charged bladder accumulators changes as the temperature varies and this can cause problems. For example, to mitigate the effects of changing gas charge pressure due to temperature, a temperature control system had to be added to regulate the temperature of the accumulators. To ensure that the gas charge remains within allowable limits, periodic monitoring and maintenance of the gas pressure is required. This solution proved costly, complex, potentially unreliable, and resulted in a large, costly peripheral system. As a result, the addition of multiple accumulators to the turbine system to achieve higher reliability would not be fruitful in most applications. In fact, the use of accumulators increases the potential for gas leakage and lowers the overall reliability of the system.

In another attempt to deal with pressure spikes or transient pressures, three-way shut-off valves have been used in turbine systems. Unfortunately, these devices are generally not very fast (e.g., they need 100 milliseconds to accomplish shut-off) and are not easily scalable to larger sizes while maintaining desired cost and package size. Also, these designs are generally limited to liquid fuel or water applications. Thus, an apparatus that can eliminate or mitigate the effects of pressure spikes and transient pressures in a cost effective, reliable, and efficient manner would be desirable. The invention provides such an apparatus. These and other advantages of the invention, as well as additional inventive features, will be apparent from the description of the invention provided herein.

BRIEF SUMMARY OF THE INVENTION

In one aspect, the invention provides an apparatus for reducing transient pressure spikes in a fuel line of a turbine system. The turbine system has a shut-off valve and a relief valve. The relief valve is upstream of the shut-off valve in the fuel line. The apparatus comprises a body, a biasing member, and a moveable separation member. The body forms a first chamber and a second chamber. The first chamber is coupled to the fuel line upstream of the shut-off valve and the second chamber is coupled to the fuel line downstream of the shut-off valve. The biasing member and the moveable separation member are within the body. The moveable separation member is forcibly biased toward the first chamber by the biasing member and separates the first and second chambers when the shut-off valve is open. The moveable separation member is adapted to expand the first chamber and compress the biasing member when the shut-off valve is closed. The expanding first chamber accumulates fuel while the relief valve is opening such that the transient pressure spikes are reduced and unlikely to cause damage to the turbine system.

In another aspect, the invention provides an apparatus for reducing transient pressure spikes in a fuel line of a turbine system. The turbine system has a shut-off valve. The apparatus comprises a body, a biasing member, and a moveable separation member. The body has first, second, and third chambers. The first chamber is coupled to the fuel line upstream of the shut-off valve and the second chamber is coupled to the fuel line downstream of the shut-off valve. The third chamber is adjacent to and coupleable with the first chamber. The a biasing member and the moveable separation member are within the body. The moveable separation member is biased toward the first chamber by the biasing member and separates the first chamber from the second chamber when the shut-off valve is open. The moveable separation member is adapted to expand the first chamber, compress the biasing member, and place the first chamber and the third chamber in fluid communication when the shut-off valve is closed. At least one of the expanding first chamber and the third chamber accumulate fuel when the shut-off valve is closed. As such, the transient pressure spikes are reduced and unlikely to cause damage to the turbine system.

In yet another aspect, the invention provides an apparatus for reducing transient pressure spikes in a fuel line of a turbine system. The turbine system has a shut-off valve. The apparatus comprises a body, a biasing member, and a moveable separation member. The body includes first, second, and third chambers. The first chamber is coupled to the fuel line upstream of the shut-off valve and the second chamber is coupled to the fuel line downstream of the shut-off valve. The third chamber is adjacent to and coupleable with the first chamber. The third chamber is coupled to a return line. The biasing member and the moveable separation member are within the body. The moveable separation member is biased toward the first chamber by the biasing member and separates the first chamber from the second chamber. The moveable separation member restricts flow between the first and third chambers when the shut-off valve is open. The moveable separation member is adapted to expand the first chamber, compress the biasing member, and place the first chamber and the third chamber in fluid communication when the shut-off valve is closed. The expanded first chamber accumulates fuel and the third chamber evacuates the fuel through the return line. As such, the transient pressure spikes are reduced and unlikely to cause damage to the turbine system.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention performs extremely fast, permits a high fuel flow rate, requires no temperature or pressure control system, alleviates hydraulic and mechanical vibration and/or damage to adjacent upstream and downstream components and sensitive equipment, is suitable for both gas and liquid fuels, is cost effective, and can be integrally constructed with a conventional shut-off valve. Prior to describing the invention in detail, an exemplary environment in which the invention may operate shall be briefly described. Those skilled in the art will recognize that the invention may operate in other environments.

Figure 1:
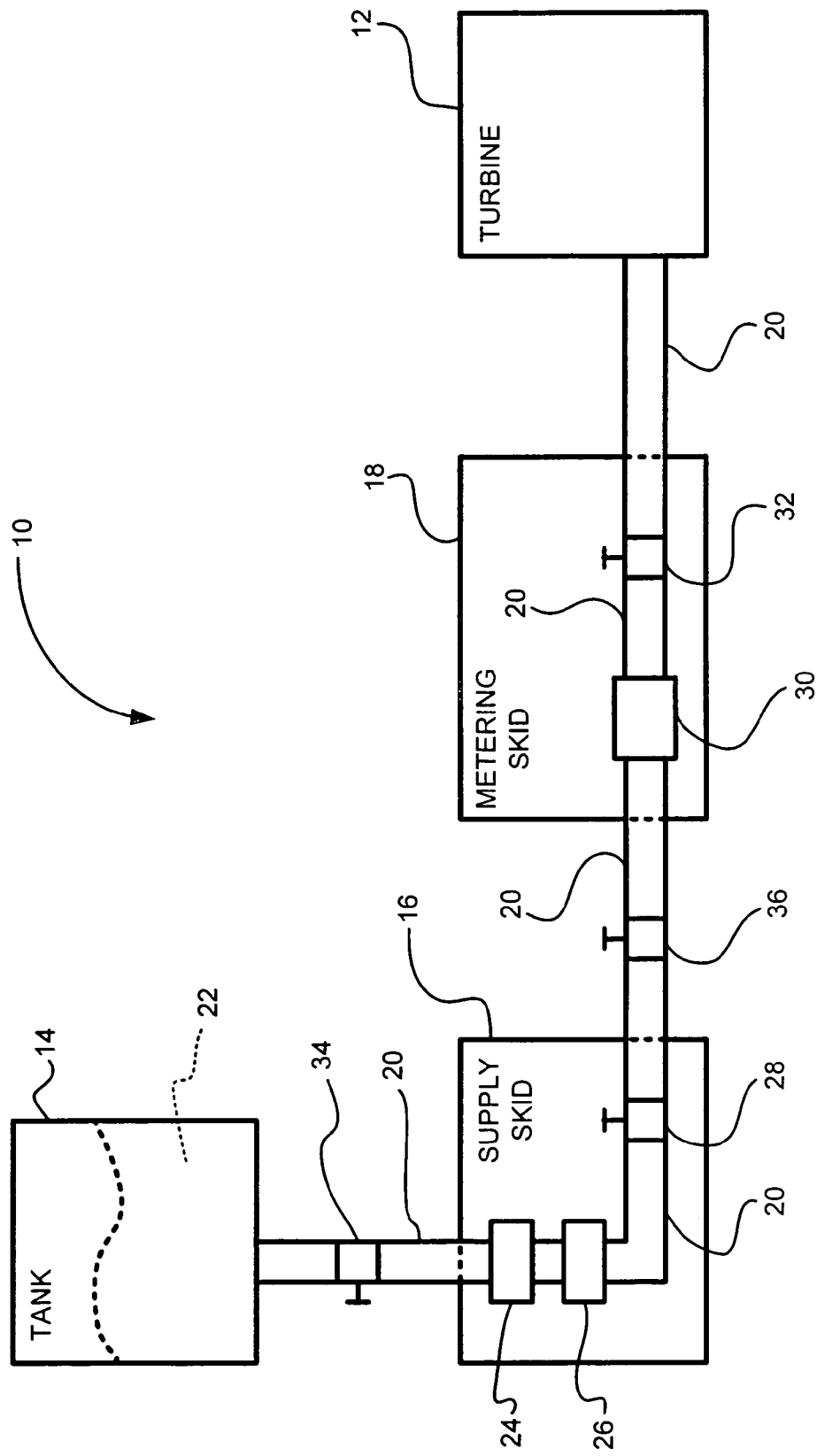
FIG. 1 is a simplified schematic of a turbine system environment that employs shut-off valves and in which the invention may operate.

Referring to FIG. 1, a turbine system 10 used to generate electricity is shown. The turbine system 10, which provides the exemplary environment for the invention, includes, among other things, an industrial turbine 12 (e.g., a gas turbine), a supply tank 14, a supply skid 16, and a metering skid 18 linked together by one or more sections of a fuel line 20 or fuel pipe. In some cases, the fuel line 20 between the supply skid 16 and the metering skid 18 can be seventy feet or more in length.

The industrial turbine can be one of a variety of turbines commercially available in the industry such as, for example, the LMS 100™ High Efficiency Gas Turbine manufactured by GE Power Systems of Houston, Tex. The industrial turbine 12 is supplied or fed with a fuel 22 that is stored in the supply tank 14 and transported through the fuel line 20. The fuel 22 that powers the industrial turbine 12 is preferably a liquid fuel such as, for example, diesel fuel, jet fuel, kerosene, a gaseous fuel, and the like, as known in the art.

The supply skid 16 includes, among other things, a pump 24 for pressurizing and pushing the fuel 22 through the fuel line 20, a filter 26 for removing contaminants from the fuel, and a shut-off valve 28. The metering skid 18 includes, among other things, metering equipment 30 (e.g., sensors, monitors) and a shut-off valve 32. One or more relief valves, such as relief valves 34, 36, are adapted to relieve pressure within the fuel line 20 and can be incorporated into the turbine system 10 in a variety of different locations.

Figure 2:
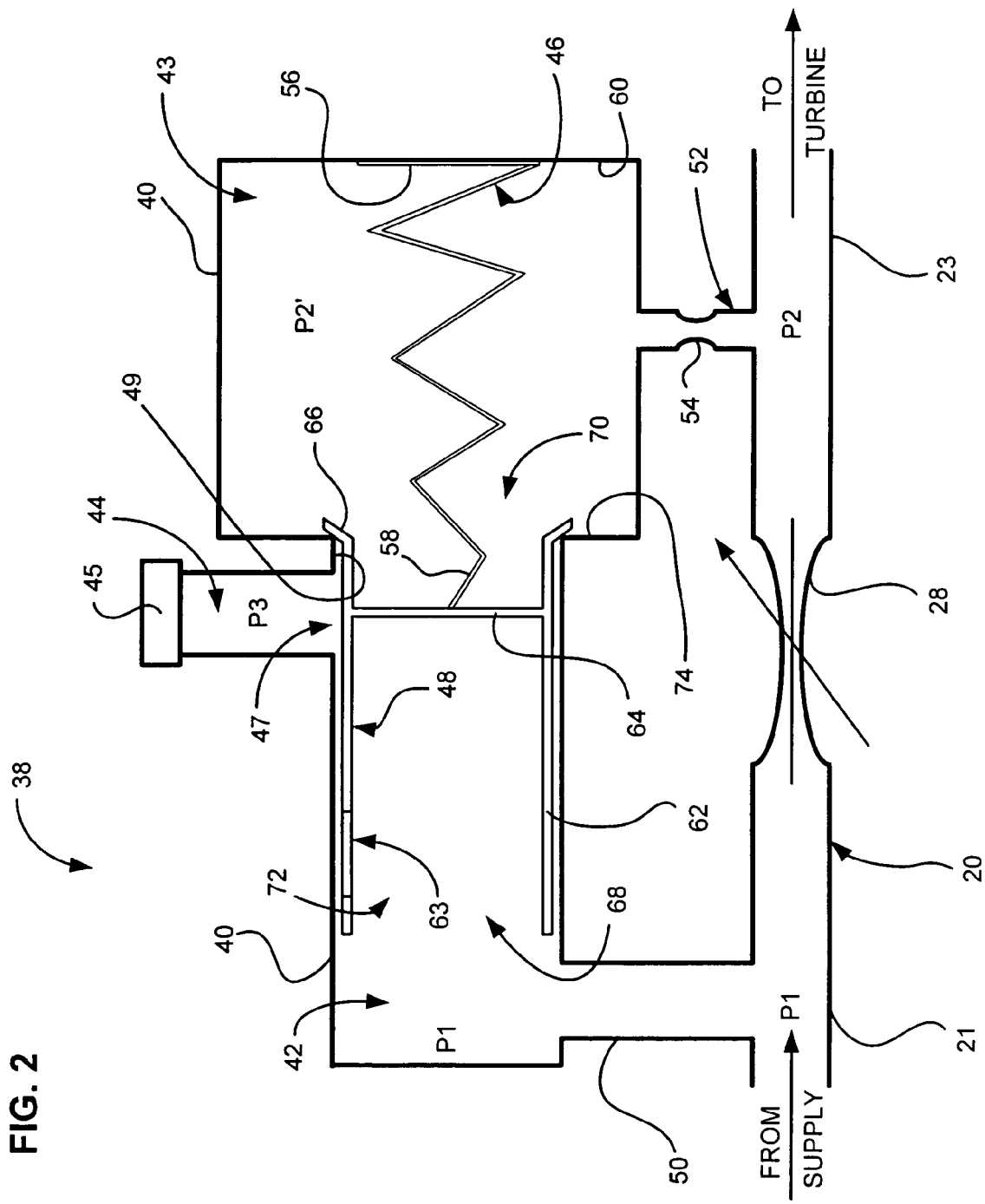
FIG. 2 is a simplified schematic of one exemplary embodiment of an apparatus for elimination of transient pressure spikes in a closed position and constructed in accordance with the teachings of the present invention.

Now that an environment in which the invention may operate has been described, details of the invention shall be articulated. As illustrated in FIG. 2, an apparatus 38 for eliminating and/or mitigating transient pressure spikes in a positive fluid system, such as the turbine system 10, is shown. The apparatus 38 comprises a body 40 forming a first chamber 42, a second chamber 43, a third chamber 44, a biasing member 46, and a moveable separation member 48.

The body 40 can be made of any suitable valve material as known in the art. The body 40 can be integrally formed with the fuel line 20 and the shut-off valve 28 as shown in FIG. 2 or, alternatively, can be configured such that the apparatus 38 is capable of being retro-fit onto an existing fuel line 20. As depicted, the body 40 generally houses and incorporates the biasing member 46 and the moveable separation member 48.

As shown in FIG. 2, the apparatus 38 is coupled to the fuel line 20 and is "straddling" one of the shut-off valves, namely valve 28. For the purposes of illustration and explanation, the fuel line 20 is referred as having an upstream portion 21 coming from the supply tank 14 and a downstream portion 23 proceeding toward the industrial turbine 12. The two portions 21, 23 are defined and separated by the shut-off valve 28. The upstream portion 21 is generally at an upstream pressure (P1)

while the downstream portion is generally at a downstream pressure (P2) when the shut-off valve 28 is open and permitting full flow as shown in FIG. 2.

The first chamber 42 is defined by portions of the body 40 and portions of the moveable separation member 48. The first chamber 42 is coupled to the upstream portion 21 of the fuel line 20 by a pressure line 50 (i.e., a relief port). The pressure line 50 permits unrestricted and full fluid communication between the upstream portion 21 of the fuel line 20 and the first chamber 42. Therefore, the first chamber 42 and the upstream portion 21 generally have an equivalent pressure (P1) when the shut-off valve is open. As illustrated, the first chamber 42 is dimensioned to correspond to the size and shape of the moveable separation member 48. Preferably, the first chamber 42 is a cylindrical and has smooth inner walls.

The second chamber 43 is defined by portions of the body 40 and portions of the moveable separation member 48. Preferably, the second chamber 43 is cylindrical and is larger than the first chamber 42. Therefore, the intersection of the first and second chambers 42, 43 defines an annular opening 49 (i.e., a second relief port) in the body 40 as illustrated in FIG. 2. The second chamber 43 is coupled to the downstream portion 23 of the fuel line 20 by a sense line 52. The sense line 52 preferably includes an orifice 54 that restricts the flow of fuel 22 between the second chamber 43 and the downstream portion 23. Due to the orifice 54, the second chamber 43 has a pressure (P2') that is somewhat lower than the pressure (P2) in the downstream portion 23 of the fuel line 20 when the shut-off valve is open.

Figure 3:
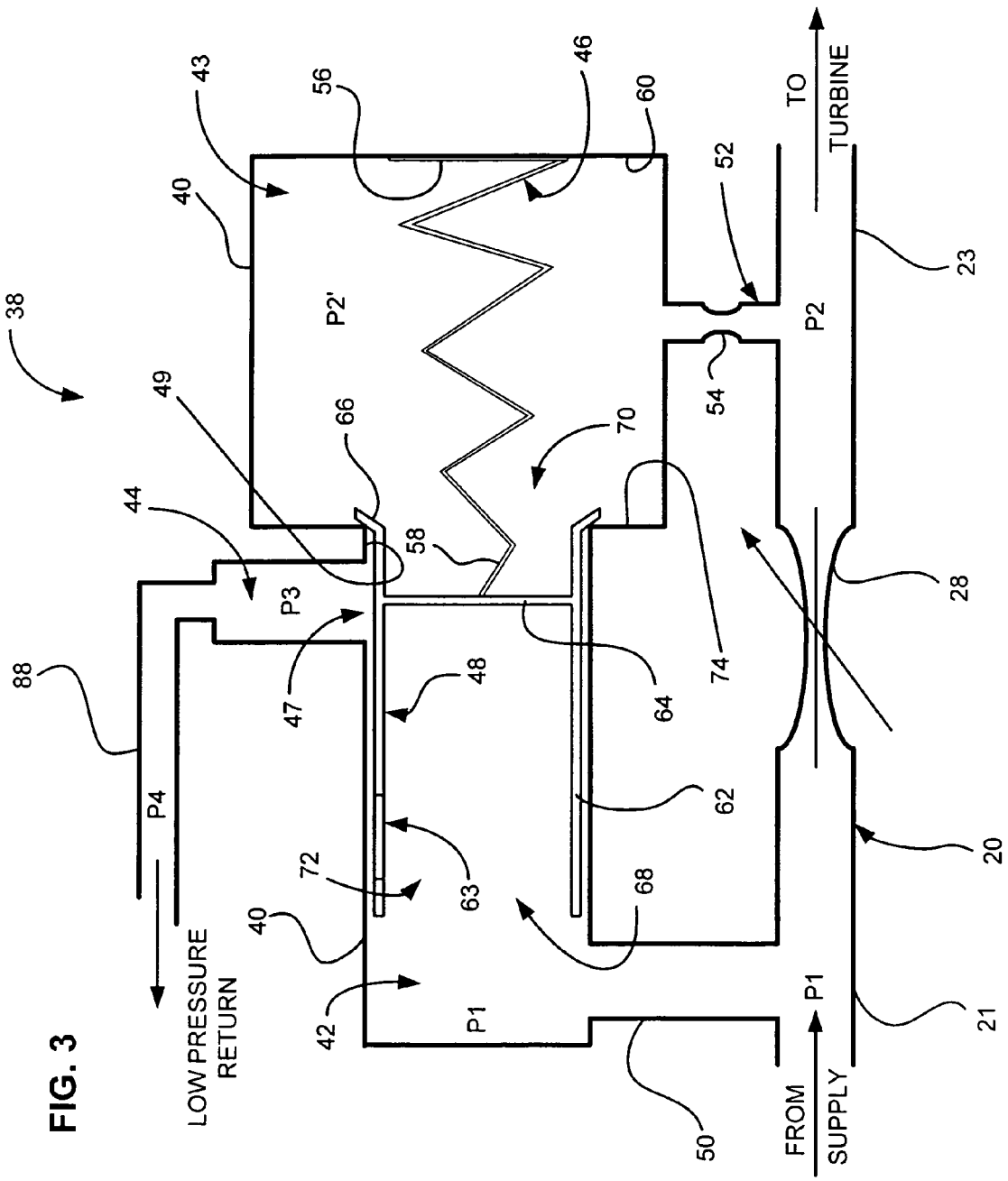
FIG. 3 is a simplified schematic of another exemplary embodiment of an apparatus for elimination of transient pressure spikes in a closed position and constructed in accordance with the teachings of the present invention.

As shown in FIG. 2, the third chamber 44 is defined by portions of the body 40, the moveable separation member 48, and a plug 45. The third chamber 44 is generally adjacent to the first chamber 42 and at a third pressure (P3). In a preferred embodiment as shown in FIG. 3, where like reference numerals indicate like components, the plug 45 is removed and replaced by a return line 88 that is coupled to the third chamber 44. The return line 88 is preferably at a low pressure (P4) in the range of zero to about three hundred pounds per square inch gauge. As shown in FIGS. 2-3, the third chamber 44 is restricted from fluid communication with the first chamber 42 by the moveable separation member 48 while the shut-off valve 28 is open.

The biasing member 46 is preferably a resilient component such as, for example, a spring that includes a first end 56 and a second end 58. The first end 56 is anchored to a back wall 60 of the body 40 in the second chamber 43 while the second end 58 is secured to the moveable separation member 48. In an alternative embodiment, the biasing member 46 can be disposed in other locations such as, for example, in the first chamber 42 or outside the body 40 altogether. When installed in the apparatus 38, the biasing member 46 is preferably in at least a partially compressed condition. As such, the biasing member 46 biases the moveable separation member 48 toward the first chamber 42 and into engagement with the body 40. In other words, the biasing member 46 is provided with a "preload". The biasing member 46 is indifferent to pressure and temperature changes and, therefore, there is no need for a pressure and/or temperature control system to regulate the environment of the biasing member 46.

The moveable separation member 48 separates the first chamber 42 from the second chamber 43. While the moveable separation member 48 is shown as a plunger in the embodiment depicted in FIG. 2, the moveable separation member can be a diaphragm, a piston, a bladder, and the like. The plunger-type moveable separation member 48 includes a cylindrical body 62, an aperture 63 in the cylindrical body, a circular cross member portion 64 extending transversely between the inner walls of the body, and a flange 66.

The aperture 63 in the cylindrical body 62 is offset and misaligned with respect to an opening 47 of the third chamber 44. In an exemplary embodiment, the aperture 63 and the opening 47 are offset by about one half inch measured from the closest edge of each opening. Also, the generally cylindrical body 62 has a first open end 68 directed toward the first chamber 42 and a second open end 70 directed toward the second chamber 43. The first open end 68, the body 62, and/or the cross member 64 collectively form an accumulation cavity 72 or "cup" adapted to catch and capture the fuel 22.

The cylindrical body 62 is dimensioned to allow the moveable separation member 48 to move and translate within the apparatus 38. Preferably, the moveable separation member 48 is adapted to reciprocate axially back and forth such that portions of the cylindrical body are transitioned from being within the first chamber 42 to the second chamber 43, and vise versa. As shown in FIG. 2, the flange 66 extends radially outwardly from an end of the body 62 disposed in the second chamber 43 and restricts the moveable separation member 48 from progressing entirely into the first chamber 42 by engaging a seating portion 74 of the body 40. Although not shown, one or more sealing components can be interposed between the cylindrical main body 62 and the body 40 and/or between the flange 66 and the seating portion 74.

The moveable separation member 48 is generally positioned across the shut-off valve 28. In fact, when the shut-off valve is fully opened, the cross member 64 is preferably vertically aligned with the shut-off valve 28 as oriented in FIG. 2. When situated in this manner, the moveable separation member 48 is able to automatically sense a pressure differential across the shut-off valve 28. In other words, the moveable separation member 48 is sensitive to a pressure difference between the first and second chambers 42, 44 and between the upstream and downstream portions 21, 23 of the fuel line 20.

When the turbine 12 is operating at capacity and a maximum amount of fuel 22 is passing through the fuel line 20 and the shut-off valve 28, there is preferably only a small pressure difference (e.g., about ten pounds per square inch) across the cross member 64 (i.e., between the first and second chambers 42, 44 and the upstream and downstream portions 21, 23). This small pressure differential, which would encourage the moveable separation member 48 to move toward the second chamber 43, is counteracted by the biasing force provided by the biasing member 46 due to the preload. Therefore, during normal operation with the shut-off valve 28 fully open, the flange 66 from the moveable separation member 48 is biased against a seating portion 68 of the body 40.

In an exemplary embodiment, the biasing member 46 has an axial length of about eight inches when in an unbiased, fully-expanded state. Additionally, when interposed in a partially compressed state between the moveable separation member and a back wall 60 of the body 40 in the second chamber 43, the biasing member 46 exerts approximately one hundred thirty pounds of biasing force on the moveable separation member 48. Further, the moveable separation member 48 has a diameter of about two inches and six tenths (a radius of one inch and three tenths) in the exemplary embodiment and the biasing member 46 is rated to provide about eighty pounds of force per inch. In such an exemplary embodiment, the moveable separation member 48 has a mass of one and three tenths pounds and the orifice 54 has a diameter of about five hundredths of an inch.

Continuing with the exemplary embodiment, the static friction between the body 40 and the moveable separation member is about ten pounds per square inch differential while the dynamic friction is about two pounds per square inch. Based on these parameters, the maximum estimated velocity (i.e., speed) of the moveable separation member 48 is about one hundred twenty inches per second.

In operation, the apparatus 38 is called upon to perform when the shut-off valve 28 is rapidly closed such as, for example, in milli- or microseconds. For example, one of the shut-off valves as known in the art, such as valve 28, can restrict flow as quickly as sixty-five milliseconds. Since about fifty of those milliseconds are due to cascaded first and second stage delays, the valve 28 actually progresses from permitting maximum flow to permitting no flow in around fifteen milliseconds.

Referring to FIG. 2, when the shut-off valve 28 is quickly closed, the upstream pressure (P1) in the upstream portion 21 of the fuel line 20 rapidly increases. The rate of pressure increase and the pressure increase are greater if the pump 24 (FIG. 1) is still pumping, has not yet been deactivated, and/or deactivates slower than the shut-off valve is able to close. As the pressure (P1) in the upstream portion 21 of the fuel line 20 rises, the pressure (P1) in the first chamber 42 correspondingly rises since fluid communication exists via the pressure line 50. The rising pressure in the first chamber 42 causes a force to be exerted on the moveable separation member 48. As the force acting on the moveable separation member 48 increases, the biasing force of the biasing member 46 on the moveable separation member begins to be overcome.

Additionally, with the shut-off valve 28 closed, the downstream pressure (P2) in the downstream portion 23 of the fuel line begins to rapidly decrease. The rapid decrease in pressure (P2) causes the pressure (P2') in the second chamber 43 to also decrease since fluid communication exists via sense line 52. This is much different from a standard accumulator that has an increasing pressure in a second chamber due to an increasing pressure in a first chamber. Since the pressure (P2') in the second chamber 43 is decreasing simultaneously with an increasing pressure (P1) in the first chamber 42, the pressure differential across the cross member 64 of the moveable separation member 48 quickly rises. Therefore, the moveable separation member 48 is able to respond and move much quicker than a conventional accumulator. The rate of pressure decrease and pressure decrease in the second chamber 43 might be greater if the turbine 12 (FIG. 1) continues to operate and demand a continuing supply of the fuel 22 in the downstream portion 23 of the fuel line 20.

The elevated pressure in the first chamber 42 and the decreased pressure in second chamber 43 collectively begin to rapidly change the pressure differential across the moveable separation member 48. When the pressure differential across the moveable separation member 48 reaches a particular level, which is determined by the preload and biasing force of the biasing member 46, the moveable separation member begins to move toward the second chamber 43. For example, in the exemplary embodiment, the level is about twenty-five to seventy-five pounds per square inch differential. Since the particular amount of pressure differential needed to move the moveable separation member 48 is relatively small, movement of the moveable separation member is almost instantaneous when the shut-off valve 28 is closed.

Figure 4:
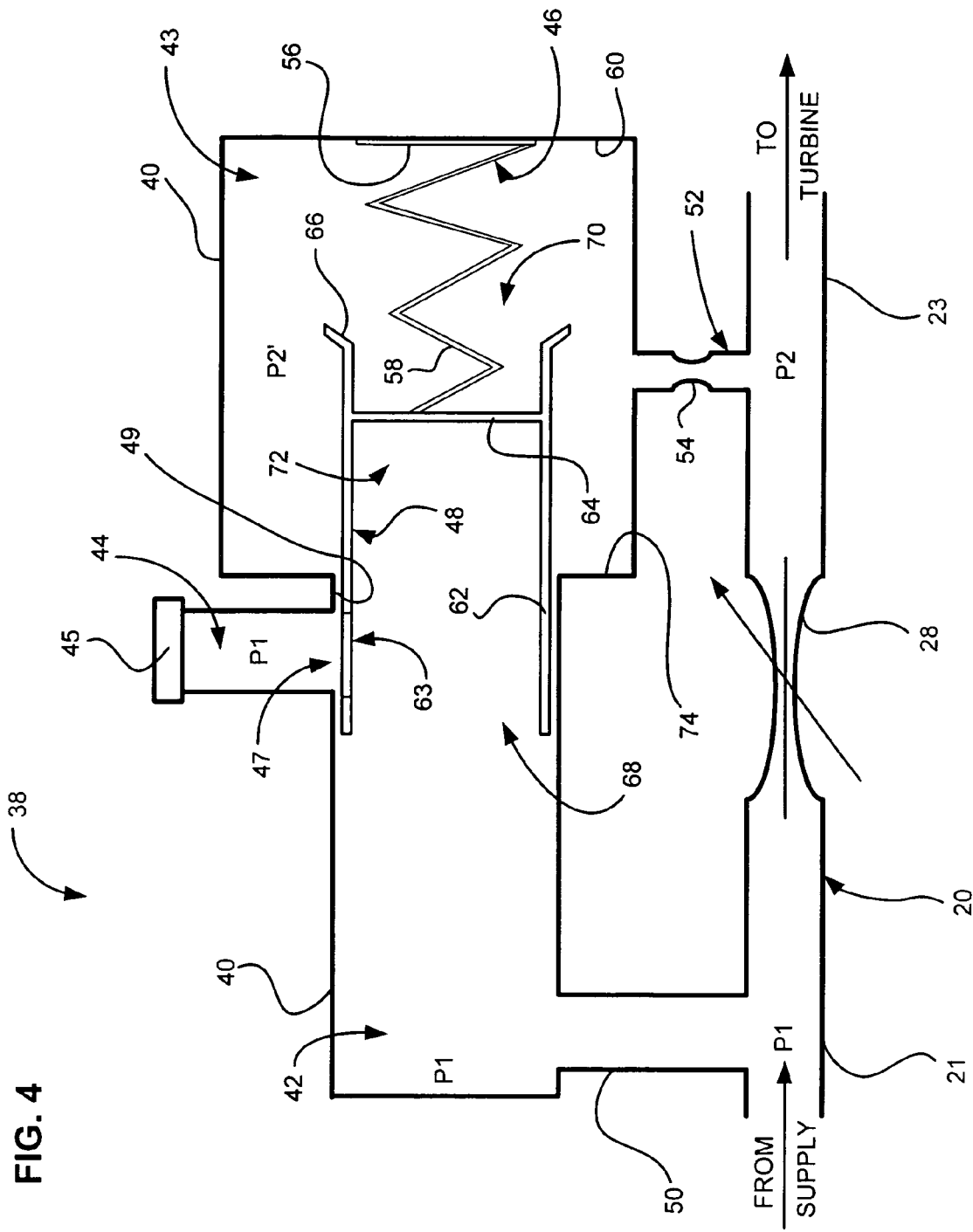
FIG. 4 is a simplified schematic of the apparatus of FIG. 2 in an open position.
Figure 5:
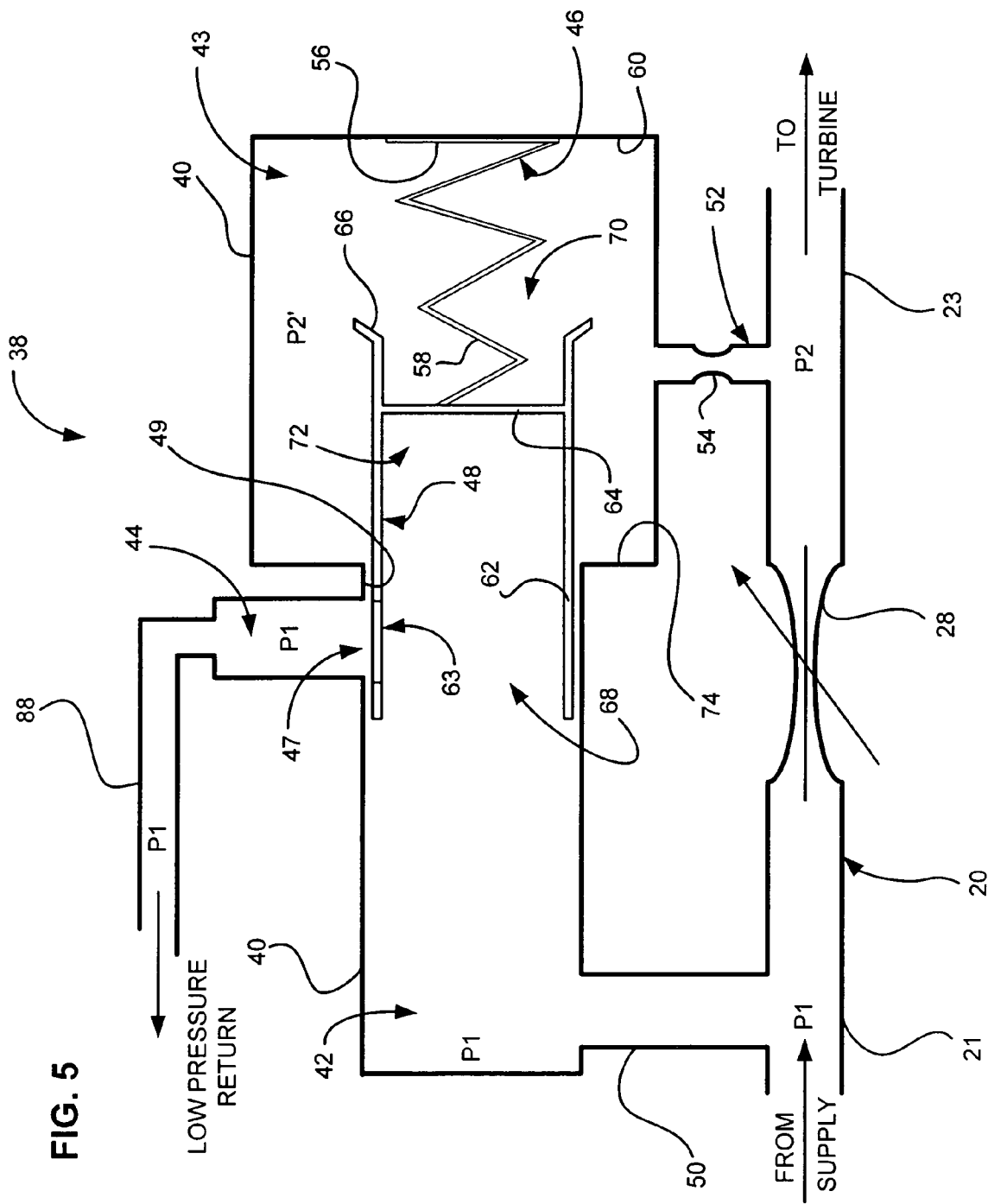
FIG. 5 is a simplified schematic of the apparatus of FIG. 3 in an open position.

The apparatus 38, and in particular the moveable separation member 48, is able to move extremely quickly transition from the "closed" position shown in FIGS. 2-3 to an "open" position as shown in FIGS. 4-5. As the moveable separation member 48 translates from the closed position to the open position, the first chamber 42 is expanded such that the apparatus 38, using the accumulation cavity 72, functions somewhat like an accumulator. Preferably, the expanding first chamber 42 (FIGS. 4-5) is able to absorb fuel 22 at a rate faster than the pump 24 is able to output the fuel. In the exemplary embodiment, the expanding first chamber 42 can absorb six hundred forty cubic inches of the fuel 22 per second, which is about ten percent more than the pump can output. Since the expanded first chamber 42 can absorb the total pump flow for a brief time, there is more time available to overcome the fluid momentum in return line 88 and the third chamber 44 and the opening 47 can be relatively small.

After the moveable separation member 48 has moved a sufficient distance toward the second chamber 43, the aperture 63 is no longer blocked by the body 40 and aligns with the opening 47 of the third chamber 44 as shown in FIGS. 4-5. In the open position, the aligned aperture 63 and opening 47 permit additional fuel 22 to be subsequently evacuated from the expanded first chamber 42 and vented into the third chamber 44. If the third chamber 44 is coupled to a return line 88 as shown in FIG. 5, the fuel 22 can also be expelled through the return line. Therefore, not only does the apparatus 38 permit the accumulation of a significant amount of the fuel 22, the apparatus also permits the fuel to be vented into a third chamber 44 and, in some cases, a return line 88.

In the embodiment illustrated in FIG. 4, one or more of the accumulation cavity 72, the expanded first chamber 42, and the third chamber 44 absorb enough of the fuel 22 to provide one or more of the relief valves 34, 36 (FIG. 1) with a sufficient amount of time to open and alleviate the pressure within an upstream portion 21 of the fuel line 20. In the embodiment illustrated in FIG. 5, one or more of the accumulation cavity 72, the expanded first chamber 42, the third chamber 44, and the return line 88 absorb enough of the fuel 22 to dissipate the pressure within the upstream portion 21 of the fuel line 20. Since the return line 88 is employed, the relief valves 34, 36 are generally not needed.

From the foregoing, it can be seen that the dual functionality (absorb and vent) of the apparatus 38 eliminates pressure spikes and transient pressures that, left uncompensated for, can cause damage throughout the turbine system 10, both upstream and downstream of the shut-off valve 28, due to mechanical and/or hydraulic vibrations when one of the shut-off valves 38, 32 is rapidly closed. Thus, sensitive components such as, for example, sensors, filter, containers, pipes, and the like are spared from damage.

Advantageously, the apparatus 38 is self-actuating so that additional control systems are not required, does not require additional pump flow or an actuation source (e.g., an electric, a hydraulic, and a pneumatic source), and operates without an increase in parasitic flow rate. Further, the apparatus 38 does not alter the leakage classification of the shut-off valves 28, 32, eliminates the need to use higher-pressure flanges and piping, and is cost effective, more reliable, and less complex than alternate solutions that attempt to mitigate and/or eliminate transient pressure spikes. Also, flow forces (e.g., Bernoulli forces that tend to resist the motion of the cross member 64) cannot cause instability because the cross member is already moving at a maximum speed by the time the aperture 63 is uncovered.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for reducing transient pressure spikes in a fuel line of a turbine system, the turbine system having a shut-off valve and a relief valve, the relief valve upstream of the shut-off valve in the fuel line, the apparatus comprising:
    a body forming a first chamber and a second chamber, the first chamber coupled to the fuel line upstream of the shut-off valve, the second chamber coupled to the fuel line downstream of the shut-off valve;
    a biasing member within the body; and
    a moveable separation member within the body, the moveable separation member forcibly biased toward the first chamber by the biasing member and separating the first and second chambers when the shut-off valve is open, the moveable separation member adapted to expand the first chamber and compress the biasing member when the shut-off valve is closed, the expanding first chamber accumulating fuel while the relief valve is opening such that the transient pressure spikes are reduced and unlikely to cause damage to the turbine system.

2. The apparatus of claim 1, wherein the biasing member is a partially compressed spring.

3. The apparatus of claim 1, wherein the moveable separation member is a member selected from the group consisting of a plunger, a diaphragm, a piston, and a bladder.

4. The apparatus of claim 1, wherein a first portion of the moveable separation member is disposed in the first chamber and a second portion is disposed in the second chamber, the second portion forcibly biased further into the second chamber when the shut-off valve is closed.

5. The apparatus of claim 1, wherein the second chamber is coupled to the fuel line downstream from the shut-off valve by a sense line, the sense line including a sense line orifice.

6. An apparatus for reducing transient pressure spikes in a fuel line of a turbine system, the turbine system having a shut-off valve, the apparatus comprising:
    a body having first, second, and third chambers, the first chamber coupled to the fuel line upstream of the shut-off valve and the second chamber coupled to the fuel line downstream of the shut-off valve, the third chamber adjacent to and coupleable with the first chamber;
    a biasing member within the body; and
    a moveable separation member within the body, the moveable separation member biased toward the first chamber by the biasing member and separating the first chamber from the second chamber when the shut-off valve is open, the moveable separation member adapted to expand the first chamber, compress the biasing member, and place the first chamber and the third chamber in fluid communication when the shut-off valve is closed, at least one of the expanding first chamber and the third chamber accumulating fuel when the shut-off valve is closed such that the transient pressure spikes are reduced and unlikely to cause damage to the turbine system.

7. The apparatus of claim 6, wherein the expanded first chamber and the third chamber are adapted to provide a relief valve with time to open when the shut-off valve is closed.

8. The apparatus of claim 6, wherein the third chamber is coupled to a return line, the return line adapted to evacuate the fuel from at least one of the third chamber, the expanded first chamber, and the line upstream of the shut-off valve when the shut-off valve is closed.

9. The apparatus of claim 6, wherein the third chamber includes an opening directed toward the first chamber and the moveable separation member includes an aperture directed toward the third chamber, the moveable separation member adapted to block the opening when the shut-off valve is open and adapted to align the aperture and the opening when the shut-off valve is closed.

10. The apparatus of claim 6, wherein the moveable separation member is a plunger having an accumulation cavity, the accumulation cavity having an opening directed toward the first chamber and adapted to receive the fuel when the shut-off valve is closed, the received fuel biasing the moveable separation member toward the second chamber.

11. The apparatus of claim 6, wherein a first pressure in the first cavity is equivalent to an upstream pressure in the line upstream of the shut-off valve.

12. The apparatus of claim 6, wherein a second pressure in the second cavity is less than a downstream pressure in the line downstream of the shut-off valve.

13. The apparatus of claim 6, wherein a force acting on the moveable separation member from a first pressure in the first cavity is equivalent to a counteracting force upon the moveable separation member from both a second pressure in the second cavity and the biasing member when the shut-off valve is open.

14. The apparatus of claim 6, wherein a force acting on the moveable separation member from a first pressure in the first cavity is greater than a counteracting force upon the moveable separating member from both a second pressure in the second cavity and the biasing member when the shut-off valve is closed and fuel is flowing in the fuel line.

15. The apparatus of claim 6, wherein the fuel is a fuel selected from the group consisting of jet fuel, diesel fuel, and kerosene.

16. The apparatus of claim 6, wherein the shut-off valve is disposed on a supply skid within a gas turbine system, the supply skid adapted to supply the fuel line with the fuel.

17. The apparatus of claim 6, wherein the shut-off valve is disposed on a metering skid within a gas turbine system, the metering skid adapted to monitor the fuel transported by the fuel line.

18. An apparatus for reducing transient pressure spikes in a fuel line of a turbine system, the apparatus comprising:
   a body including first, second, and third chambers, the first chamber coupled to the fuel line upstream of a shut-off valve and the second chamber coupled to the fuel line downstream of the shut-off valve, the third chamber adjacent to and coupleable with the first chamber, the third chamber coupled to a return line;
   a biasing member within the body; and
   a moveable separation member within the body, the moveable separation member biased toward the first chamber by the biasing member and separating the first chamber from the second chamber, the moveable separation member restricting flow between the first and third chambers when the shut-off valve is open, the moveable separation member adapted to expand the first chamber, compress the biasing member, and place the first chamber and the third chamber in fluid communication when the shut-off valve is closed, the expanded first chamber accumulating fuel and the third chamber evacuating the fuel through the return line such that the transient pressure spikes are reduced and unlikely to cause damage to the turbine system.

19. The apparatus of claim 18, wherein the third chamber further accumulates the fuel.

20. The system of claim 18, wherein the biasing member is a partially compressed spring and the moveable separation member is a plunger having an accumulation cavity with an opening directed toward the first chamber.

21. The system of claim 18, wherein the shut-off valve is integrally formed with the body.

* * * * *